2,798,276
Patented July 9, 1957

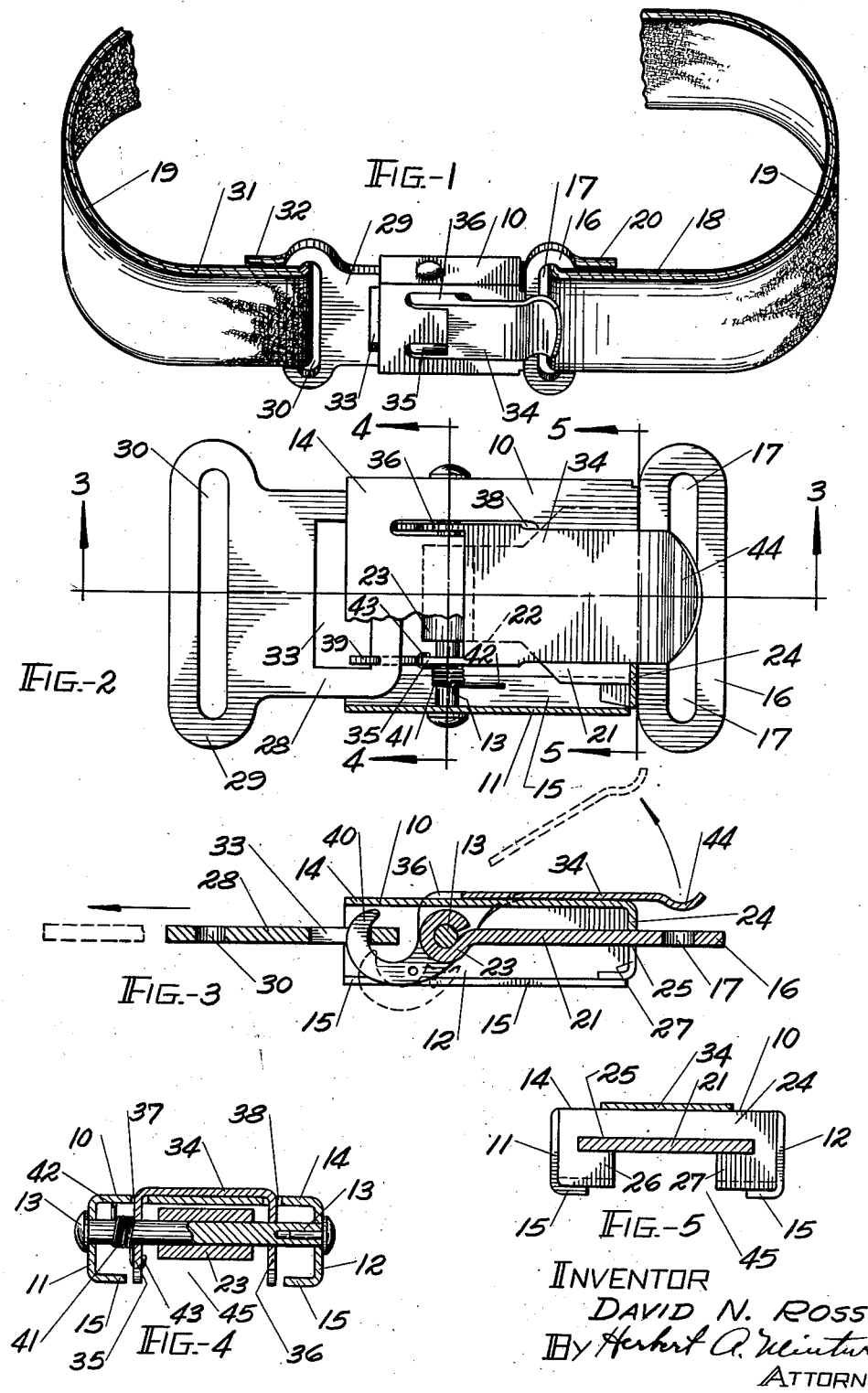

2,798,276
QUICK RELEASE SAFETY BELT BUCKLE

David N. Ross, Indianapolis, Ind.

Application November 2, 1955, Serial No. 544,494

3 Claims. (Cl. 24—211)

This invention relates to a buckle device for joining the ends of a safety belt such as would be used in aeroplanes, automobiles, and the like particularly to retain an individual on a seat when the vehicles may be subjected to a sudden impact or stoppage.

One of the difficulties with the devices of which I am aware and which have been employed for the purpose indicated is that it often occurs that when the vehicle involved in a wreck or a crash landing depending upon the type of vehicle, the individual is held securely in position on the seat and cannot be released quickly, and therefore, may be subjected to burning to death in case of fire arising.

A primary object of my invention is first to provide a device which is exceedingly durable and quite easily operated and interconnecting the belt ends. Secondly, the primary object includes a construction wherein the belt may be released quickly by simply flipping a lever, but at the same time giving assurance that the lever will not accidentally be flipped to release the belt or permit it to open at the connection.

Additional objects of the invention reside in the simplicity of construction as well as relatively low cost of production, and the extreme durability of the device over long periods of use such as throughout the life of the vehicle in which the safety belt is installed.

These and many other objects and advantages of the invention will become apparent to those versed in the art in the following description of one particular form of the invention as illustrated in the accompanying drawing, in which Fig. 1 is a view in front perspective of the device embodying the invention;

Fig. 2 is a view on an enlarged scale in front elevation in partial section detached from the belt;

Fig. 3 is a view in longitudinal section on the line 3—3 in Fig. 2;

Fig. 4 is a view in transverse section on the line 4—4 in Fig. 2; and

Fig. 5 is a transverse view on the line 5—5 in Fig. 2.

A rectangular, tubular tunnel 10 is formed as the body of the buckle involving the invention and between the side walls 11 and 12 of this tunnel 10 there is mounted a pin 13. As indicated in Fig. 4, this pin 13 is mounted somewhat above the centers of these walls 11 and 12, so as to have the pin 13 nearer the top side 14 than it is from the underside 15.

In the form herein shown, which of course may be varied depending upon the desired manner of attaching the device to the belt, I provide a member 16 having the elongated opening 17 therethrough, so as to receive the end 18 of the belt 19 whereby the belt end 18 may be threaded through that opening 17 and brought around by an end portion 20 to lap against the belt end 18 and be there secured in any suitable manner. From this member 16, there extends a tongue 21 within the tunnel 10 and by reduced width portion 22 is formed into an eye through which the pin 13 extends, the eye being designated by the numeral 23. The tunnel 10 has an end 24 provided with a transverse slot 25 through which the tongue 21 slides. The central portion of the end 24 is cut away as indicated in Fig. 5 leaving the ears 26 and 27 to support the tongue 21 from its underside.

The opposite end of the tunnel 10 has an opening between the top 14 to the bottom 15. Into this opening there may be inserted the tongue 28 of a plate 29 which carries an elongated opening 30 through which the other end 31 of the belt 19 may be inserted and brought around by an end 32 to secure the belt to the plate 29. This tongue 28 has an opening 33 formed therethrough, herein shown as being rectangular in shape. The width of the tongue 29 approximates the width internally of the tunnel 10, but is sufficiently less than that tunnel width to permit free entrance of the tongue 28 therein.

A lever member 34 is formed to have two downturned ears 35 and 36 respectively which enter slots 37 and 38 formed in the top 14 of the tunnel 10. From each of these ears 35 and 36, there extends forwardly the respective hooks 39 and 40. The ears 35 and 36 which receive the pin 13 therethrough straddle the eye 23 with considerable clearance as indicated in Figs. 2 and 4. Normally the lever 34 is rocked against the outer base of the top 14 of the tunnel 10 as indicated in Fig. 3, this rocking being had by means of a suitable spring, herein shown as a torsion spring 41 surrounding the pin 13, varying by end 42 against the tunnel 10 and by the other end 43 entering the ear 35, Fig. 4. Preferably the lever 34 extends beyond the end 24 of the tunnel 10 and has a rounded end portion 44 for ease of manipulation. The hooks 39 and 40 are symmetrical in shape, and have sufficient curvature to enter the opening 33 in the tongue 28 and extend slightly upwardly and rearwardly therefrom within the tunnel 10 as best indicated in Fig. 3 whereby pull on the belt end 31 will not tend to release the tongue 28 from the hooks 39 and 40, but will tend to exert a straight line pull by the belt end 31 in a common plane with the belt tongue 21.

The various members of the belt are in their normal belt connected positions as shown in the drawings. Under the extreme stress of a sudden stoppage of the vehicle, the belt will not tend to become unbuckled, since the pull on the tongue 28 would tend to carry the plate 34 forcibly against the top 14 of the tunnel 10, rather than to rock the lever 34 to a releasable position. On the other hand, for a quick release of the belt to remove the individual or to permit himself to get out of the vehicle, the lever 34 simply has to be pulled upwardly in the direction indicated by the arrow in Fig. 3 to carry the hooks to the dash line positions whereby the hooks will strip themselves from the tongue 28 by tending to pull the plate 28 downwardly against the bottom 15 of the tunnel 10. The hooks of course can be carried on around in their swinging action pivoting from the pin 13 to completely remove them from the plate 29. While the tunnel 10 has been referred to as having a bottom or floor 15, this floor 15 may be cut away through the central area in the form illustrated or rather is formed without a central area so that the hooks 39 and 40 may be rocked downwardly past the bottom of the tunnel 10 through the opening generally designated by the numeral 45. This leaves in effect the two inturned opposing bottom flanges forming the bottom floor 15.

Thus it is to be seen that I have produced an exceedingly simple yet most effective buckle for retaining the buckled condition of the belt, and at the same time I have provided a quick and easy release of the buckle to open the belt. Therefore, while I have herein shown the invention in the one particular form, it is obvious that structural changes may be made without departing from the spirit of the invention, and I therefore do not desire to be limited to that precise form beyond the limitations which may be imposed by the following claims.

I claim:

1. A buckle for engaging two end portions of a belt comprising a tunnel member having a top side, opposite side walls, one open end, and a bottom wall with an opening therethrough; a pin member extending between said side walls within the tunnel; a lever normally lying freely over said top side; said top side having spaced apart slots therethrough over said pin; an ear extending from each side edge of said plate lever member freely downwardly through said slots and rockably receiving said pin therethrough; each of said ears extending normally downwardly and forwardly from said pin terminating in an up and somewhat overturned free end as hooks, said ends being adjacent the inner side of said tunnel top side; a belt end portion engaging tongue freely entering said tunnel open end and having an opening through which said hooks may pass and retain the tongue against tunnel withdrawal; and a second tongue engaging the other belt end portion secured to said tunnel to extend therefrom oppositely from said first tongue; said first tongue being releasable from said hooks by rocking of said lever member away from the tunnel top.

2. The structure of claim 1 in which said tunnel bottom opening is defined by opposing foot-like members extending from the bottom portions of said tunnel side walls with clearance for said hooks to travel freely therebetween upon said lever member rocking; said first tongue striking said foot-like members upon said rocking to be stripped from said hooks.

3. The structure of claim 2 in which said second tongue enters said tunnel through its other end and engages said pin; said other end maintaining the second tongue in fixed position relative to said tunnel.

References Cited in the file of this patent

UNITED STATES PATENTS

| | | |
|---|---|---|
| 1,904,230 | Hildebrand | Apr. 18, 1933 |
| 2,105,484 | Hoffman | Jan. 18, 1938 |
| 2,750,644 | Martin et al. | June 19, 1956 |